(12) United States Patent
Nezu

(10) Patent No.: US 10,156,309 B2
(45) Date of Patent: Dec. 18, 2018

(54) LOCK MECHANISM OF TUBULAR BODY

(71) Applicant: NIFCO INC., Yokosuki-shi, Kanagawa (JP)

(72) Inventor: Mikio Nezu, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 112 days.

(21) Appl. No.: 15/502,080

(22) PCT Filed: Aug. 4, 2015

(86) PCT No.: PCT/JP2015/072122
§ 371 (c)(1),
(2) Date: Feb. 6, 2017

(87) PCT Pub. No.: WO2016/021612
PCT Pub. Date: Feb. 11, 2016

(65) Prior Publication Data
US 2017/0227153 A1 Aug. 10, 2017

(30) Foreign Application Priority Data
Aug. 7, 2014 (JP) .................................. 2014-161506

(51) Int. Cl.
*F16L 37/12* (2006.01)
*F16L 37/088* (2006.01)
*F16L 37/138* (2006.01)

(52) U.S. Cl.
CPC ................................ *F16L 37/1225* (2013.01)

(58) Field of Classification Search
CPC ..... F16L 37/084; F16L 37/088; F16L 37/101; F16L 37/12; F16L 37/1225; F16L 37/138; F16L 37/144
(Continued)

(56) References Cited

U.S. PATENT DOCUMENTS 2,081,571 A * 5/1937 Baade .................... F16L 37/144
285/277
2,805,089 A * 9/1957 Hansen .................. F16L 37/088
285/317
(Continued)

FOREIGN PATENT DOCUMENTS

JP   H05-33891 A    2/1993
JP   2009-138814 A  6/2009
(Continued)

OTHER PUBLICATIONS

Europe Patent Office, "Search Report for European Patent Application No. 15829706.9," dated Apr. 17, 2018.
(Continued)

*Primary Examiner* — James M Hewitt, II
*Assistant Examiner* — Stacy N Lawson
(74) *Attorney, Agent, or Firm* — Manabu Kanesaka

(57) ABSTRACT

A lock mechanism of a tubular body includes a housing to which a tubular body is mounted, a lock member locking and unlocking the housing and the tubular body, and a ring member rotatably attached on an outer periphery of the housing and moving the lock member between a lock position and an unlock position. When a locking portion of the lock member is locked to a locked portion of the housing, the lock member is retained in the unlock position. When the tubular body is inserted in the housing to unlock the locking portion and release an urging force accumulated in the lock member, the lock member moves to the lock position together with the ring member to lock the tubular body. When the ring member is slid in an axis direction of the tubular body after being locked, the tubular body can be locked with one touch.

9 Claims, 15 Drawing Sheets

(58) Field of Classification Search
USPC .............................. 285/81, 82, 314, 315, 321
See application file for complete search history.

(56) References Cited

U.S. PATENT DOCUMENTS

| | | | | |
|---|---|---|---|---|
| 2,898,130 | A | * | 8/1959 | Hansen ................. F16L 37/088 137/614.04 |
| 3,428,340 | A | | 2/1969 | Pelton |
| 4,991,880 | A | * | 2/1991 | Bernart ................. F16L 37/088 285/305 |
| 2009/0008927 | A1 | | 1/2009 | Binder et al. |
| 2009/0008928 | A1 | * | 1/2009 | Binder ................. F16L 37/088 285/39 |
| 2010/0176590 | A1 | * | 7/2010 | Binder ................. F16L 37/088 285/347 |
| 2012/0056420 | A1 | | 3/2012 | Fansler |
| 2015/0233510 | A1 | | 8/2015 | Nezu |

FOREIGN PATENT DOCUMENTS

| | | |
|---|---|---|
| JP | 2011-185309 A | 9/2011 |
| JP | 4787682 B2 | 10/2011 |
| JP | 2013-534993 A | 9/2013 |
| JP | 2014-066315 A | 4/2014 |
| WO | 2014/175401 A1 | 10/2014 |
| WO | 2015/141557 A1 | 9/2015 |

OTHER PUBLICATIONS

PCT International Search Report of PCT/JP2015/072122 dated Nov. 2, 2015.

* cited by examiner

LOCK MECHANISM OF TUBULAR BODY

TECHNICAL FIELD

The present invention relates to a lock mechanism of a tubular body used for connection of a fluid pipe or the like, and to a lock mechanism of a tubular body that can quickly and certainly perform connection and disconnection of a pipe for automobiles or the like.

BACKGROUND ART

Conventionally, there is a lock mechanism of a tube coupling that has, for performing quick insert/mount, a configuration in which a tubular body (plug) is inserted in a lock mechanism main body (socket), to automatically rotate a sleeve rotatably arranged in the socket, thereby completing a lock between the socket and the plug with one touch.

For example, in a tube coupling mechanism as indicated in Patent Literature 1, a sleeve is rotatably arranged in a socket. The tube coupling mechanism is provided with an operating element (front ball) and a lock element (rear ball) interposed between the socket and the sleeve, an operating element accommodating hole provided in the socket side, an operating element accommodating groove provided in a lock element accommodating hole side and in the sleeve side, an operating element accommodating groove inclined surface, a lock element accommodating groove and the like. The plug is inserted in the socket to push out the operating element and rotate the sleeve, so that the operating element is accommodated in the operating element accommodating groove. Subsequently, the lock element is pushed out to be accommodated in the lock element accommodating groove, and when the pushing-out of the lock element is eliminated, the lock element is accommodated in the plug groove to complete the lock (Patent Literature 1).

CITATION LIST

Patent Literature

Patent Literature 1: Japanese Patent No. 4787682

SUMMARY OF INVENTION

Technical Problem

In Patent Literature 1, however, only by inserting the tubular body (plug) in the lock mechanism main body (socket), the sleeve can be automatically rotated to establish one touch connection, but there is no change in outer appearance between before the connection and after the connection and it is difficult to confirm whether or not the connection is securely performed. Furthermore, since the sleeve is rotated by using the pushing-in force of the plug, this tube coupling mechanism is suitable for a tube coupling having a small diameter but, is not suitable for a lock mechanism of a tubular body having a large diameter.

Particularly, it is difficult to use this tube coupling mechanism for a large-diameter tubular body in which a work region is narrow due to an overcrowded state of an engine room or the like and an operation with a low insert force is required.

This invention is made for solving the aforementioned problems, and an object of this invention is to provide a lock mechanism of a tubular body that can lock a tubular body to a housing with one touch, securely maintain a double lock state and confirm the lock state visually.

Solution to Problem

In order to solve the above object, a lock mechanism of a tubular body includes a housing having one end to which a tubular body provided with an engagement portion is at least mounted; a lock member that can lock and unlock the housing and the tubular body; and a ring member that is rotatably attached on an outer periphery of the housing and can move the lock member between a lock position and an unlock position, wherein the ring member includes a locking portion; when the locking portion is locked to a locked portion of the housing, the lock member is retained in the unlock position in a state where an urging force is accumulated in the lock member; when the tubular body is inserted in the housing to unlock the locking portion and release the urging force accumulated in the lock member, the lock member moves to the lock position together with the ring member to lock the tubular body; and when the ring member is slid in an axis direction of the tubular body after being locked, a fitting portion provided in the ring member is fitted in a fitted portion provided in the housing to prevent rotation of the ring member.

In the lock mechanism of the tubular body according to the present invention, preferably, the locking portion is an elastic element; the locked portion is a hole portion; the elastic element enters the hole portion to be locked; the tubular body is provided with a lock release projecting portion; and the lock release projecting portion pushes the elastic element out of the hole portion to perform the lock release. With this configuration, when the lock release projecting portion pushes the elastic element out of the hole portion, since the ring member is not rotated until the tubular body is completely inserted, the lock operation is not performed in an incomplete state.

In the lock mechanism of the tubular body according to the present invention, preferably, the lock member includes a bend portion bent in an axial direction of the housing; the ring member includes a projecting portion in a position corresponding to the bend portion; and the ring member and the lock member rotate integrally by the bend portion and the projecting portion. When the lock mechanism of the tubular body according to the present invention is configured in this way, since the ring member and the lock member are integrally rotated by the bend portion and the projecting portion, it is not necessary to directly hook a finger on the bend portion of the lock member, making it possible to easily perform the release operation. In addition, the release by a tool is unnecessary.

In the lock mechanism of the tubular body according to the present invention, preferably, the housing includes a slide inclined surface, and a tip portion of the lock member slides on the slide inclined surface by a rotational operation of the ring member, whereby the lock member is enlarged to open to become in the unlock position. When the lock mechanism of the tubular body according to the present invention is configured in this way, the lock member is released by only rotating the ring member in a simple configuration, making it possible to perform a stable release operation.

In the lock mechanism of the tubular body according the present invention, preferably, the ring member, when being slid to the housing, enables an identification portion provided in the housing side to be recognized visually. When the lock mechanism of the tubular body according to the present invention is configured in this way, the completion of the locking work can be confirmed visually from the outside to improve the safety.

In the lock mechanism of the tubular body according to the present invention, preferably, the ring member, when being slid to the housing, is provided with a cover portion that covers a free end of the lock member. When the lock mechanism of the tubular body according to the present invention is configured in this way, the lock member is not exposed to the outside to reduce a risk of an inadvertent release, making it possible to securely maintain the lock state.

In the lock mechanism of the tubular body according to the present invention, preferably, the lock member includes a metallic wire rod having elasticity. When the lock mechanism of the tubular body according to the present invention is configured in this way, a high lock strength can be obtained to securely fix the tubular body on the lock mechanism. In addition, the lock mechanism of the tubular body excellent in durability can be realized. Furthermore, the lock mechanism of the tubular body can be provided at a low cost with the strength of the lock member being secured.

Advantageous Effects of Invention

According to the present invention, the tubular body can be locked to the housing with one touch due to the return of the urging force by only inserting the tubular body, and the lock state can be securely maintained. That is, when the ring member is slid, the ring member becomes a non-rotatable state to realize a double lock state, so that the lock state can be securely maintained. In addition, it is possible to confirm the completion of the lock state by performing the slide operation of the ring member. Furthermore, the operation is made possible even in a narrow place with no projection of the lock member in an outer peripheral direction. The release by the tool is unnecessary and there is no possibility that the periphery is damaged by the tool.

DESCRIPTION OF EMBODIMENTS

A lock mechanism of a tubular body in the present invention includes a housing having one end on which a tubular body provided with an engagement portion is at least mounted, a lock member that can lock and unlock the housing and the tubular body, and a ring member that is rotatably attached on an outer periphery of the housing and can move the lock member between a lock position and an unlock position, wherein the ring member includes a locking portion, and when the locking portion is locked to a locked portion of the housing, the lock member is retained in the unlock position in a state where an urging force is accumulated in the lock member, when the tubular body is inserted in the housing to unlock the locking portion and release the urging force accumulated in the lock member, the lock member moves to the lock position together with the ring member to lock the tubular body, when the ring member is slid in an axis direction of the tubular body after locked, since a fitting portion provided in the ring member is fitted in a fitted portion provided in the housing to prevent rotation of the ring member, the tubular body can be locked with one touch, and the lock state can be securely maintained and can be visually confirmed.

Figure 1:
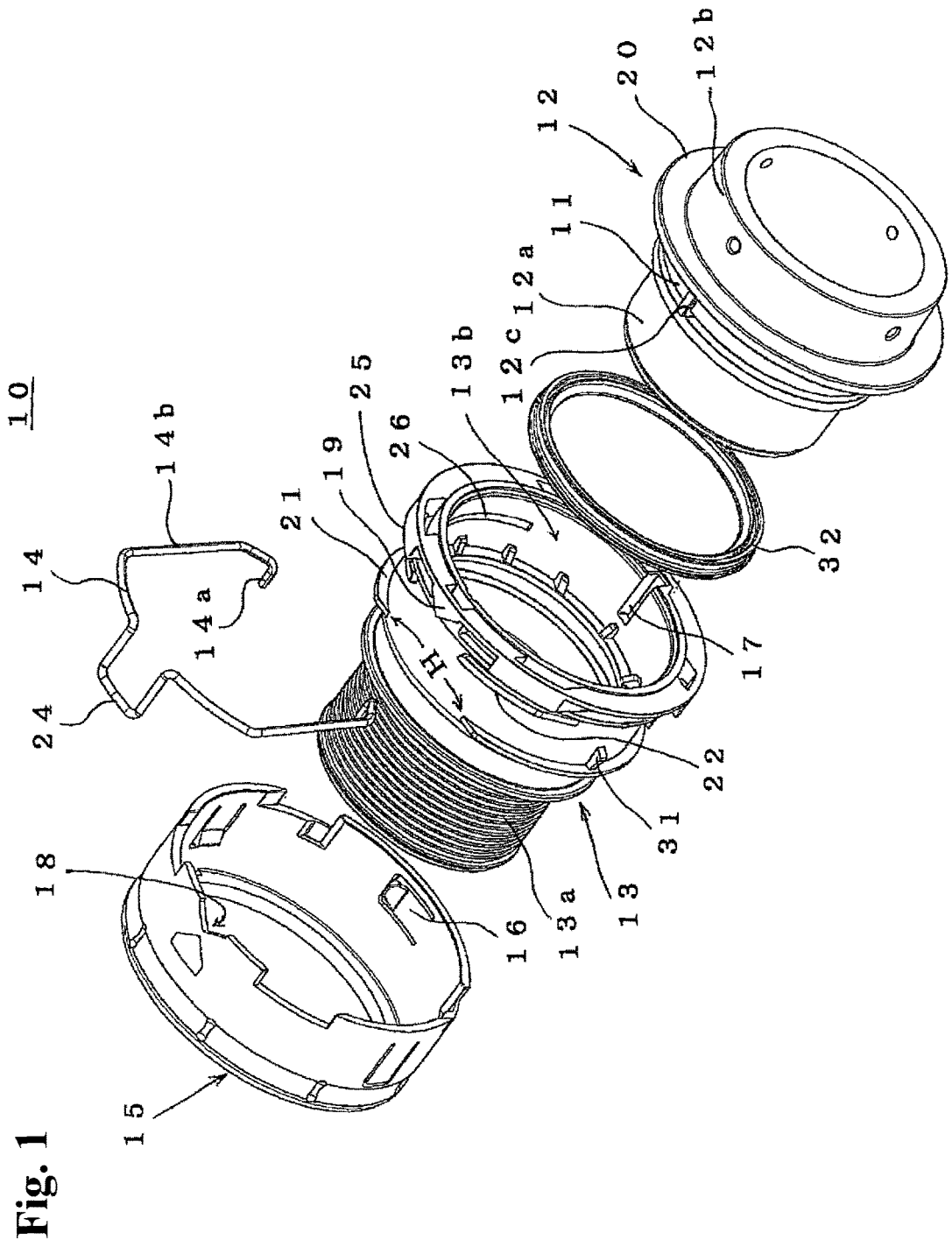
FIG. 1 is an exploded perspective view that illustrates a lock mechanism of a tubular body according to an embodiment of the present invention.
Figure 2:
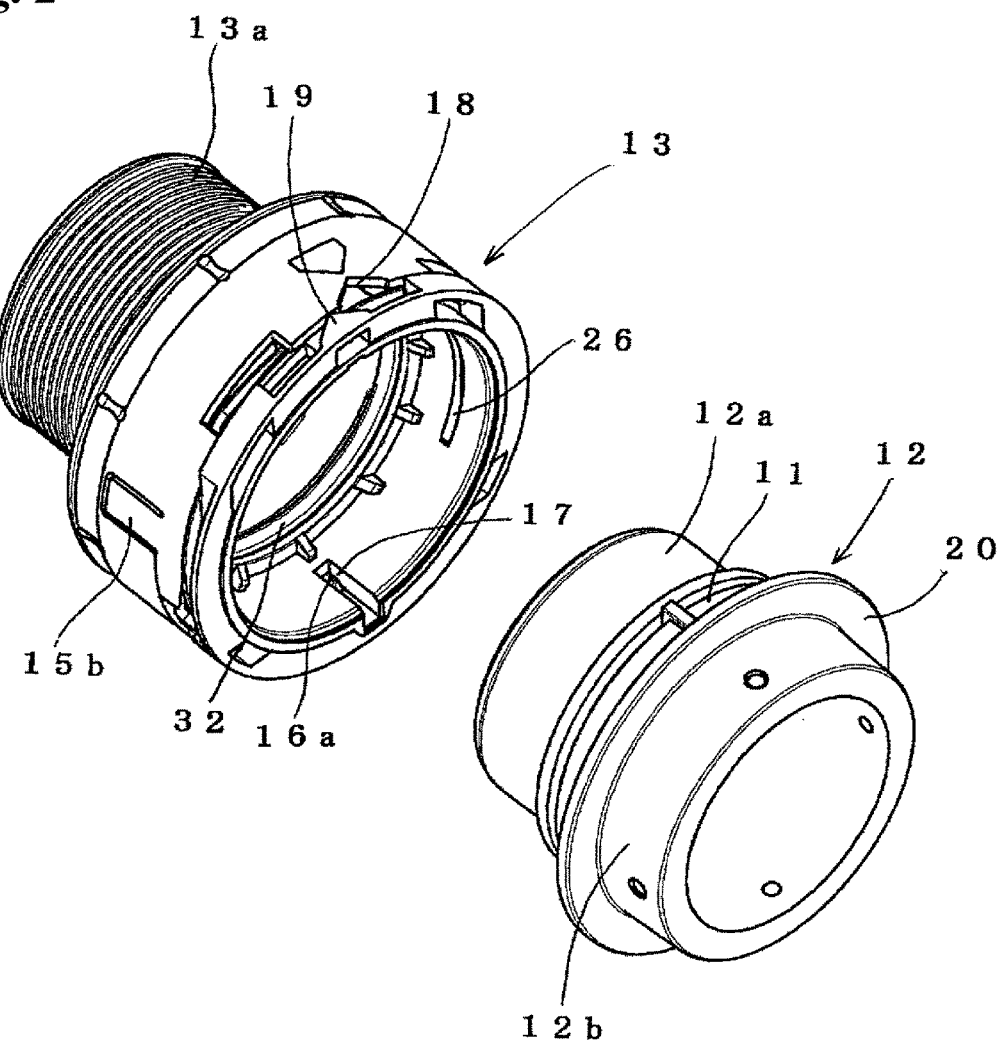
FIG. 2 is a perspective view that illustrates the lock mechanism and the tubular body.

Hereinafter, the present invention is described in detail based upon the drawings illustrating an embodiment. FIG. 1 is an exploded perspective view that illustrates a lock mechanism of a tubular body according to an embodiment of the present invention, and FIG. 2 is a perspective view that illustrates the lock mechanism and the tubular body of the present invention. Here, a lock mechanism 10 of a tubular body includes a housing 13 having one end on which a tubular body 12 provided with an engagement portion 11 is at least mounted, a lock member 14 that can lock and unlock the housing 13 and the tubular body 12, and a ring member 15 that is rotatably attached on an outer periphery of the housing 13 and can move the lock member 14 between a lock position and an unlock position, wherein the ring member 15 includes a locking portion 16, and when the locking portion 16 is locked to a locked portion 17 of the housing 13, the lock member 14 is retained in the unlock position in a state where an urging force (elastic energy) is accumulated in the lock member 14, when the tubular body 12 is inserted in the housing 13 to unlock the locking portion 16 and release the urging force accumulated in the lock member 14, the lock member 14 moves to the lock position together with the ring member 15 to lock the tubular body 12, when the ring member 15 is slid in an axis direction of the tubular body 12 after locked, since a fitting portion 18 provided in the ring member 15 is fitted in a fitted portion 19 provided in the housing 13 to prevent rotation of the ring member 15. It should be noted that a case where the engagement portion 11 is the annular groove is described, but may be an engagement step.

The tubular body 12 includes, for example, a synthetic resin, and is provided with a flange 20 in a base end portion 12b that is formed in a tubular shape and is connected to a hose, and the engagement portion 11 that is an annular groove is formed on an outer periphery of an approximately intermediate portion thereof. A tip portion 12a to be mounted to the housing 13 is tapered. Further, the tubular body 12 projects radially from the outer periphery of the tip portion 12a and is provided with a lock release projecting portion 12c extending axially, and the lock release projecting portion 12c pushes the locking portion 16 that is an elastic element, out of the locked portion 17 that is a hole portion, making it possible to release the lock. It should be noted that the tubular body 12 may have the structure of cutting off fluid as a closed plug or a plug cap (blind lid). The tubular body 12 may be made of a metallic material. Furthermore, the tubular body 12 is not only connected to the hose, but also may be formed integrally with the other structure.

The housing 13 includes, at one end, a hose connecting portion 13a to which a hose that is to be a connection opponent is connected, and at the other end, a mount opening 13b to which the tubular body 12 is mounted. The housing 13 includes, for example, a synthetic resin or the like. A plurality of annular irregularities for coming-off prevention of the hose is provided on the outer periphery of the hose connecting portion 13a. Guide walls 21 are formed on an outer peripheral top portion of the diameter-enlarged mount opening 13b to right and left from the central top portion with a gap H, interposed therebetween, for regulating a rotational range of a bend portion 24 of the lock member 14. A projection 22 is arranged to face the guide wall 21 for rotatably holding the lock member 14 along the outer periphery of the housing 13. A slit 26, through which leg portions 14b of the lock member 14 retained between the projection 22 and a guide wall 25 can pass, is formed on the outer periphery of the housing 13, and is engaged with the engagement portion 11 formed on the outer periphery of the tubular body 12 mounted on the housing 13. Furthermore, a slide inclined surface 27, on which tip portions 14a of the leg portions 14b bent inward of the lock member 14 slide, is provided on the outer periphery of the housing 13 (refer to FIG. 3). When the tip portions 14a that are tip portions of the lock member 14 slide on the slide inclined surface 27 by a rotational operation of the ring member 15, the lock member 14 is enlarged to open and becomes in the unlock position. It should be noted that the slide inclined surface 27 is not limited to a curved line having a single curvature, but may be formed by a combination of curved lines having a plurality of curvatures or by a combination of straight lines having different inclinations.

Figure 12:
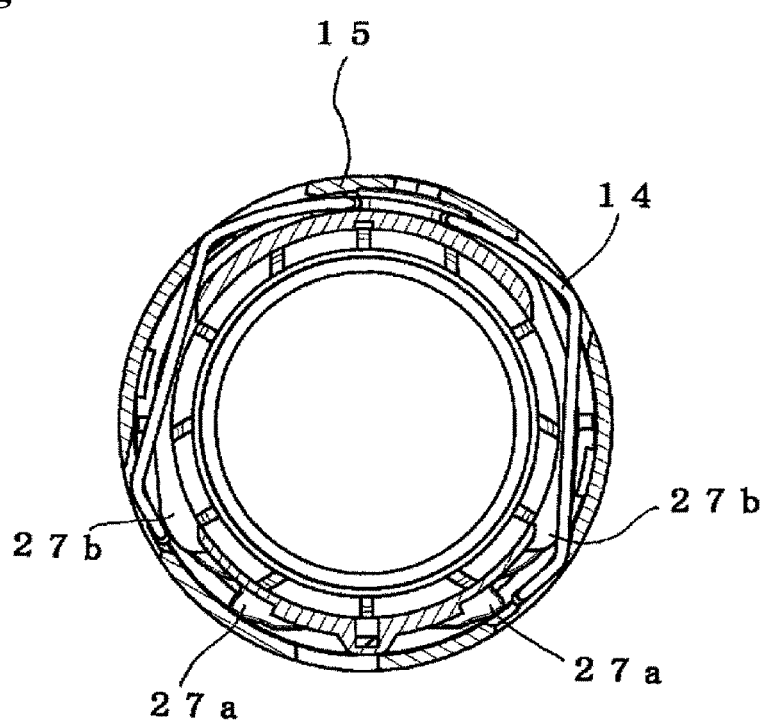
FIG. 12 is a cross section of a lock member position illustrating the lock mechanism in the waiting state.

A pair of a first slide surface 27a and a second slide surface 27b is formed in the symmetrical positions on an outer peripheral lower end of the housing 13 (refer to FIG. 12). The first slide surface 27a and the second slide surface 27b are arranged oppose to each other, and respectively have different inclinations. In the present embodiment, an inclined angle of the first slide surface 27a is formed to be large and an inclined angle of the second slide surface 27b is formed to be small. That is, the first slide surface 27a has a steep inclination and the second slide surface 27b has a gradual inclination. The tip portion 14a of the lock member 14 retained between the projection 22 and the guide wall 25 is arranged to abut on the first slide surface 27a or the second slide surface 27b in accordance with the rotation. In the present embodiment, the first slide surface 27a has an approximately vertical inclination and the second slide surface 27b is formed to be inclined in a gradual, circular shape.

Figure 3:
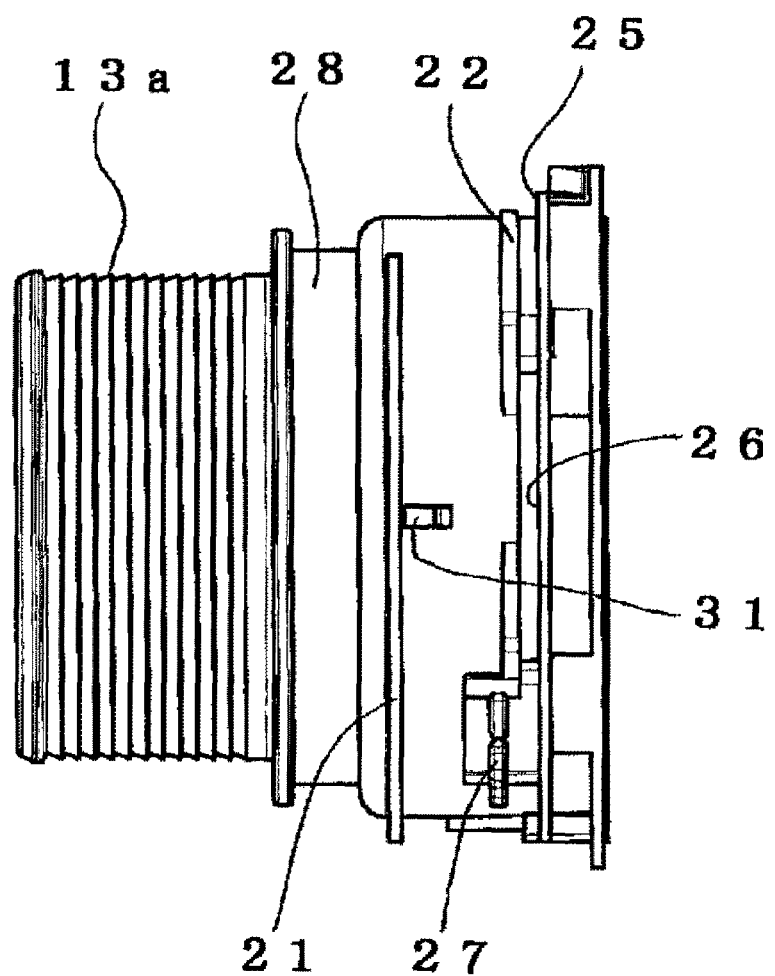
FIG. 3 is a side view that illustrates a housing configuring the lock mechanism.
Figure 4:
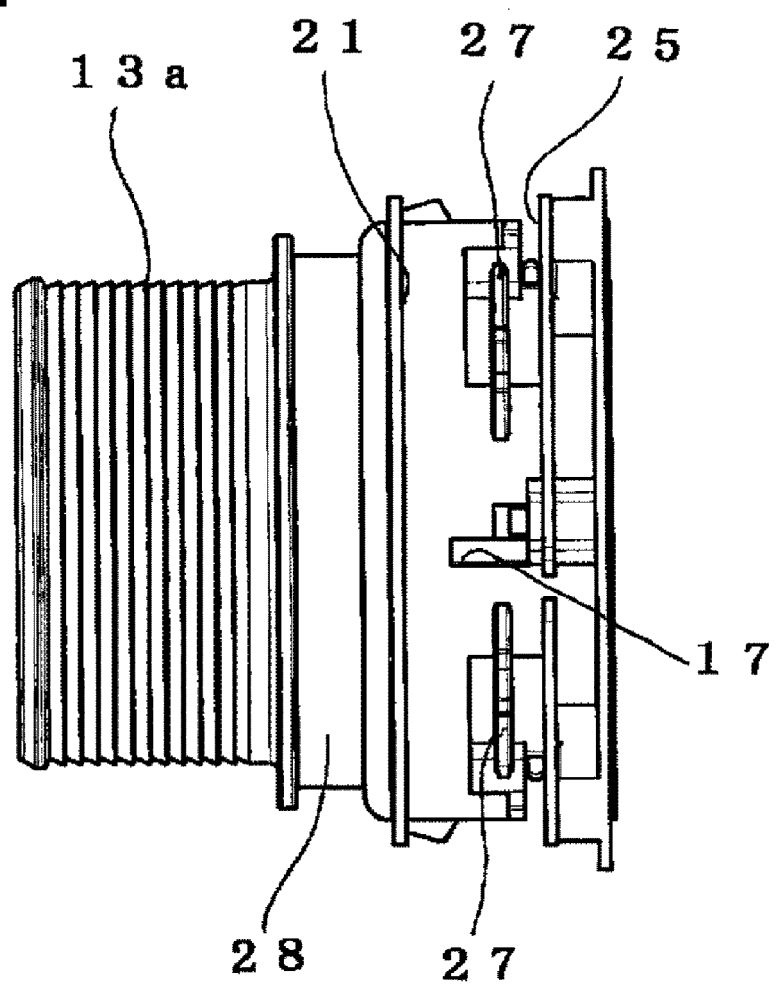
FIG. 4 is a bottom view that illustrates the housing.
Figure 11:
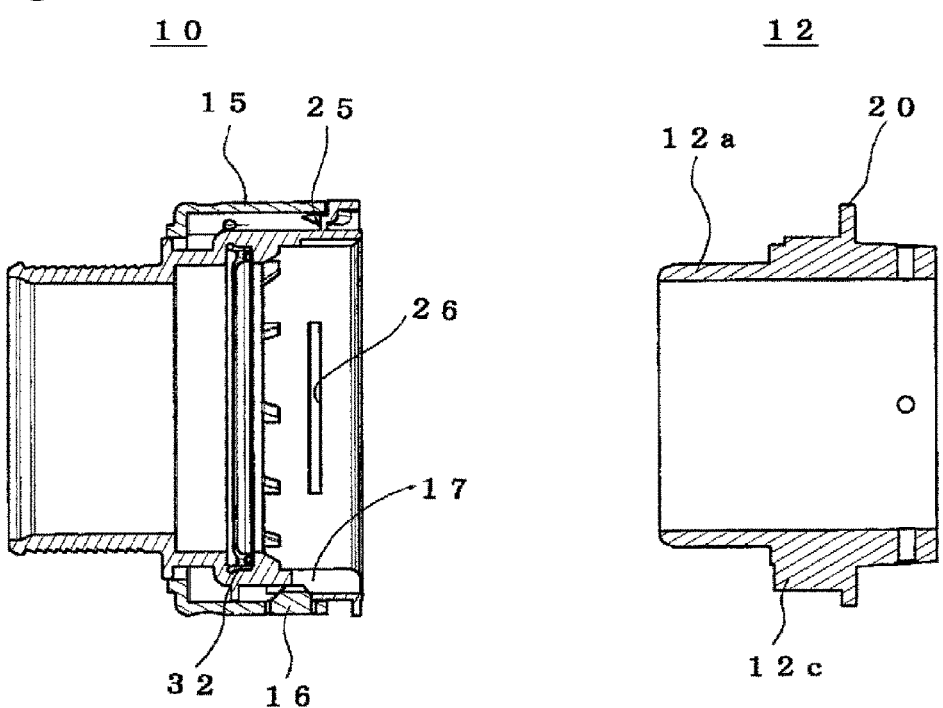
FIG. 11 is a cross section that illustrates the lock mechanism in a waiting state and the tubular body.

The housing 13, as illustrated in FIG. 3 and FIG. 4, is provided with an identification portion 28 of a distinct color, such as red, formed on the outer periphery between the hose connecting portion 13a and the guide wall 21, and is configured such that at the time of causing the ring member 15 to slide to the housing 13, the identification portion 28 appears to be capable of being confirmed visually. The identification portion 28 may be inscribed in characters or the like other than colors. Further, a seal member 32 such as an O-ring, as illustrated in FIG. 2, FIG. 11 and the like, is arranged on the deep end of the mount opening 13b of the housing 13, to secure water-tightness and airtightness with respect to the mounted tubular body 12. It should be noted that the seal member is not limited to the O-ring, but may be other seal members such as a V-ring or an X-ring.

In addition, the housing 13 may have the structure that closes an opening of the hose connecting portion 13a and cuts off fluid as a closed plug or a plug cap (blind lid).

Figure 8:
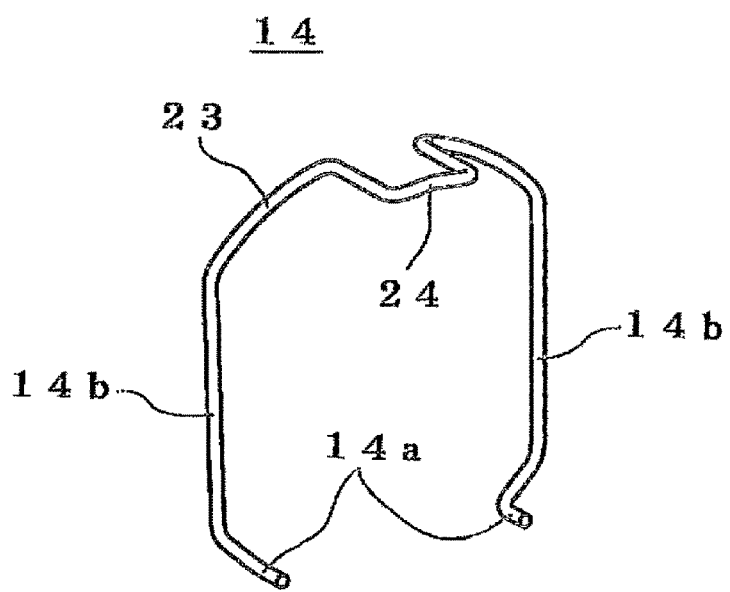
FIG. 8 is a perspective view that illustrates a lock member configuring the lock mechanism.
Figure 9:
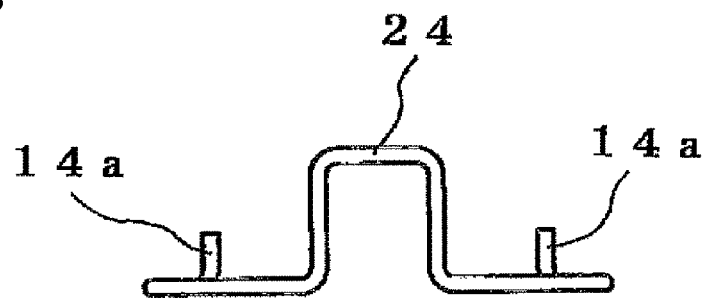
FIG. 9 is a plan view that illustrates the lock member.
Figure 10:
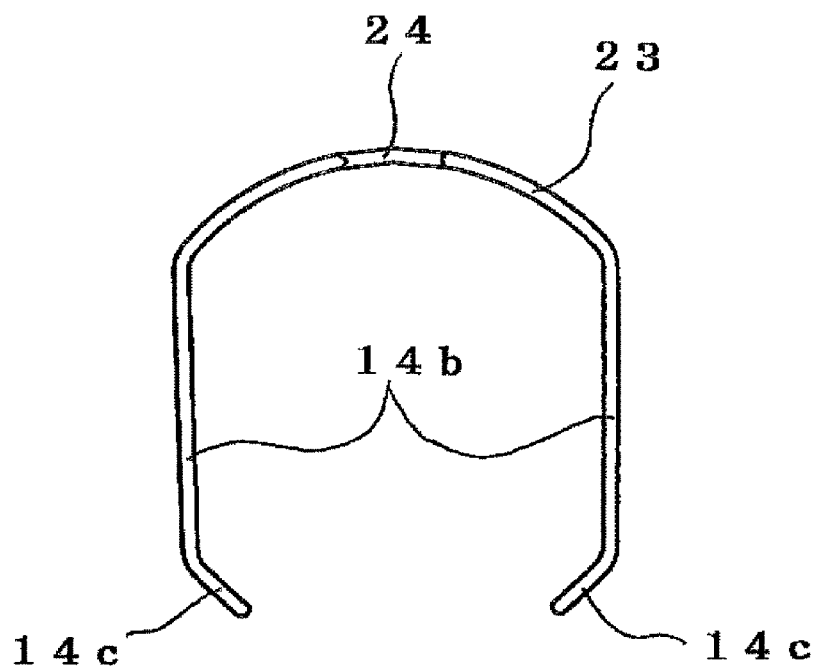
FIG. 10 is a front view that illustrates the lock member.

The lock member 14 includes, for example, a metallic elastic wire rod that is formed to be curved in such a way as to be provided with a joint portion 23 curved in a convex shape upward as illustrated in FIG. 8 to FIG. 10, leg portions 14b extending approximately linearly to each other from both sides (both sides in a width direction) of the joint portion 23, and tip portions 14a formed to be bent in a vertical direction to the leg portions 14b from bend portions 14c in tips of the leg portions 14b bent inward. A U-letter shaped bend portion 24 swollen in an axial direction of the housing 13 is formed on a top portion of the joint portion 23, and a rotational load can be applied to the bend portion 24 to be operated. In addition, the bend portion 24 has a dimension smaller than a gap H (refer to FIG. 1) between the guide walls 21 formed on the housing 13, and is accommodated herein. Furthermore, a diameter of the leg portion 14b is smaller than a width of the slit 26 (refer to FIG. 1 and FIG. 11) and can pass through the slit 26. A length dimension of the leg portion 14b is formed to be longer than a length (height dimension) of the slit 26. It should be noted that the lock member 14 may be formed of a metallic or synthetic resin plate member. That is, the lock member 14 is not limited to the wire rod, but even if the lock member 14 is formed of an elongated plate member, the same effect can be obtained.

Figure 5:
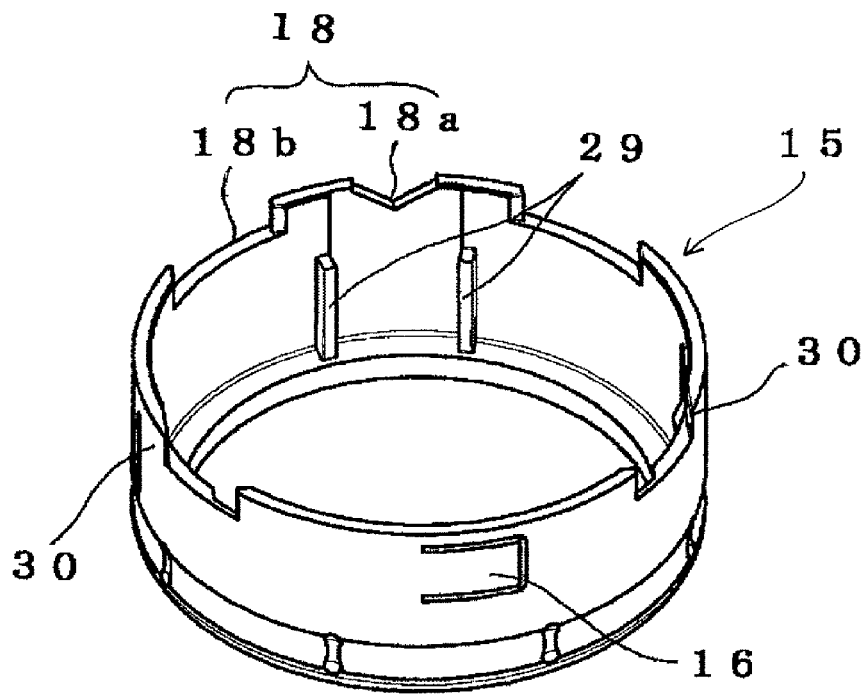
FIG. 5 is a perspective view that illustrates a ring member configuring the lock mechanism.
Figure 7:
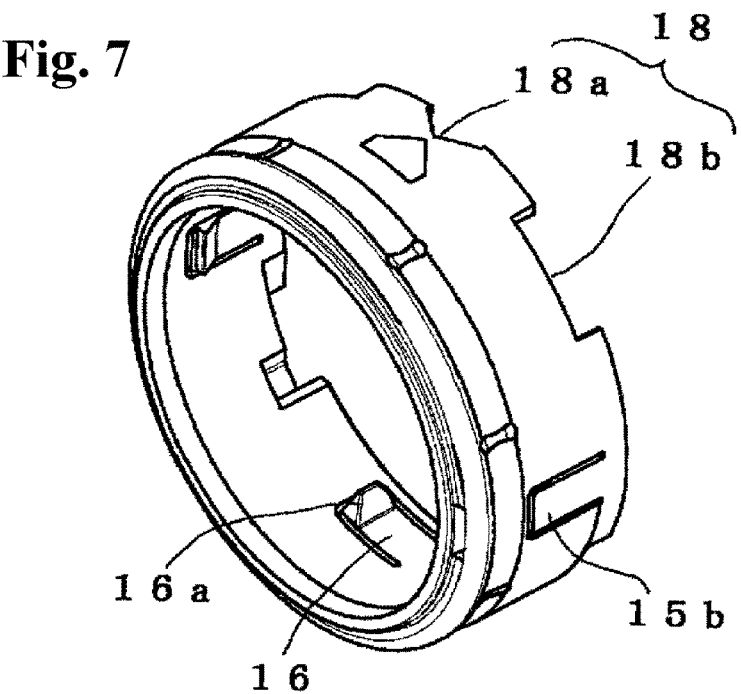
FIG. 7 is a perspective view that illustrates the ring member as viewed at a different angle.

The ring member 15 is formed in an annular shape, and is rotatably attached on the outer periphery of the housing 13 to be able to move the lock member 14 between the lock position and the unlock position. The ring member 15 includes projecting portions 29 having a predetermined interval therebetween in a position corresponding to the bend portion 24 of the lock member 14 on the top portion inner periphery as illustrated in FIG. 5. The interval between the projections 29 is exactly the size at which the bend portion 24 is accommodated. Accordingly, it is possible to rotate the lock member 14 integrally by rotating the ring member 15. Furthermore, the ring member 15 is provided with the locking portion 16 cut and raised as an elastic element from an annular wall, and the locking portion 16 includes an engagement projection 16a (refer to FIG. 7).

A fitting portion 18 that is fitted in a fitted portion 19 provided in the housing 13 side at the time when the ring member 15 is fitted in the housing 13 is formed on the ring member 15 (refer to FIG. 5). In the present embodiment, the fitting portion 18 includes a triangular notch 18a and an angular notch 18b. The notch 18a is not limited to the triangular shape, but may be formed in a quadrangular shape or the like. Furthermore, the ring member 15 is, as illustrated in FIG. 5 and FIG. 6, provided with cover portions 30 that cover free ends (tip portions 14a) of the lock member 14 upon causing the ring member 15 to rotate to the housing 13 for a slide movement.

Figure 6:
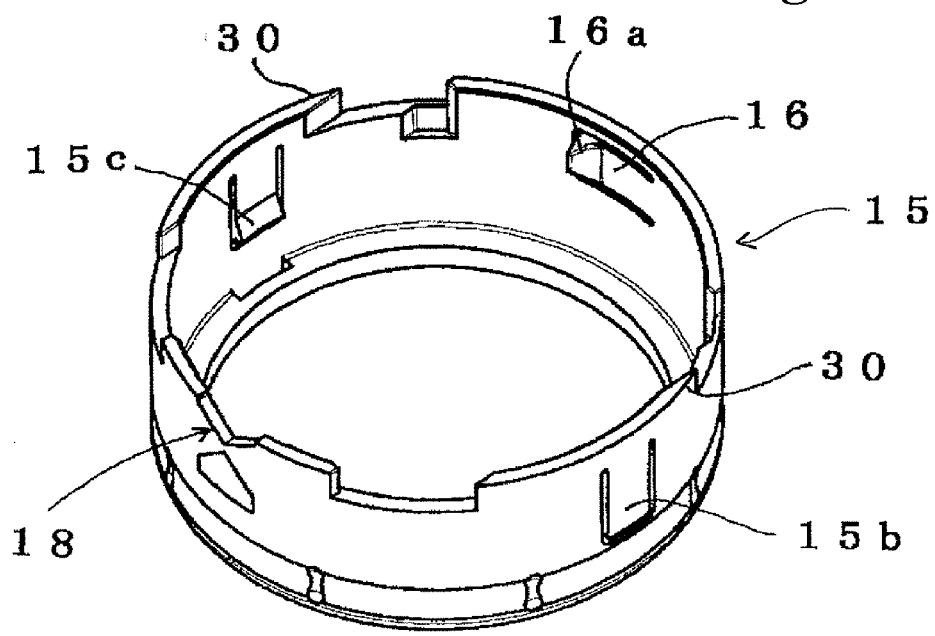
FIG. 6 is a perspective view that illustrates the ring member as viewed at another angle.

In addition, the ring member 15, upon axially performing the slide movement of the ring member 15 to the housing 13, includes lock projections 15b that retain the slide state (refer to FIG. 6). The lock projection 15b has a lock portion 15c, which is locked to a projection 31 in the housing 13 side. Upon axially performing the slide movement of the ring member 15 to the housing 13, it is possible to visually confirm the identification portion 28 provided in the housing side. Furthermore, the ring member 15 is provided with the cover portions 30 that cover the free ends (tip portions 14a) of the lock member 14.

In a case of assembling the lock mechanism 10 of the tubular body as configured above, first, the lock member 14 is attached on the housing 13 from the upper direction in FIG. 1. The attachment procedure of the lock member 14 is executed such that when the leg portions 14b between the projection 22 and the guide wall 25 are inserted in such a manner as to open to right and left and are released, the tip portion 14a is positioned between the first slide surface 27a and the second slide surface 27b by an elastic force of the wire rod.

In the present embodiment, the bend portion 24 and the tip portion 14a of the lock member 14 are attached in a direction of the hose connecting portion 13a of the housing 13. A part of the attached leg portion 14b projects into the mount opening 13b from the slit 26 of the housing 13. Furthermore, the ring member 15 is attached from the outer periphery such that the projecting portion 29 is coincide with the bend portion 24 of the lock member 14, and is rotated along the outer periphery of the housing 13 to lock the engagement projection 16a of the locking portion 16 to the locked portion 17 of the housing 13. During the working, the lock projection 15b of the ring member 15 abuts on the guide wall 21, and therefore the ring member 15 does not come out backward.

Next, in a case of connecting the tubular body 12 to the housing 13, as illustrated in FIG. 2, the tubular body 12 is mounted from the mount opening 13b in such a manner that the lock release projecting portion 12c of the tubular body 12 is coincide with the locked portion 17 of the housing 13 (refer to FIG. 11). When the tubular body 12 is inserted deeply, the engagement projection 16a of the ring member 15 is pushed out of the locked portion 17. Then, the urging force accumulated in the lock member 14 is released, the lock member 14 rotates and moves to a lock position together with the ring member 15, and the leg portion 14b projects from the slit 16 slit 26 to be engaged with the engagement portion 11, thereby locking the tubular body 12 (refer to FIG. 13 to FIG. 16).

In this way, since the urging force is released by only inserting the tubular body 12 to cause the tubular body 12 to be automatically locked, the locking work is extremely easy. The lock member 14 is not released until the tubular body 12 is inserted deeply, making it possible to prevent occurrence of a semi-fitting state. Furthermore, in a state where the tubular body 12 is inserted deeply, the seal member 32 is positioned between the outer periphery of the tip portion 12a of the tubular body 12 and the inner periphery of the mount opening 13b of the housing 13 and is pressed, making it possible to retain the water-tightness and airtightness.

Figure 17:
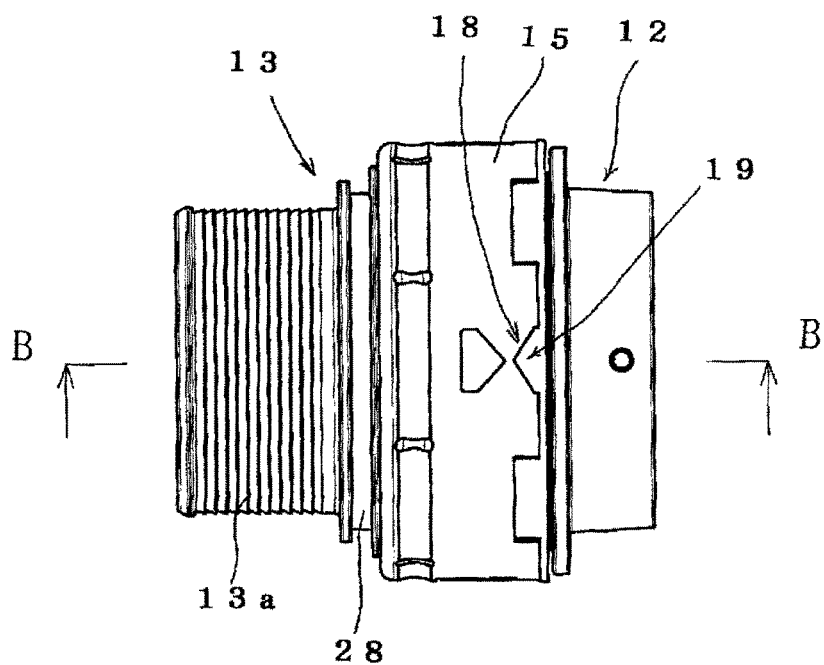
FIG. 17 is a plan view that illustrates a fastening confirmation state in which the ring member is slid.
Figure 18:
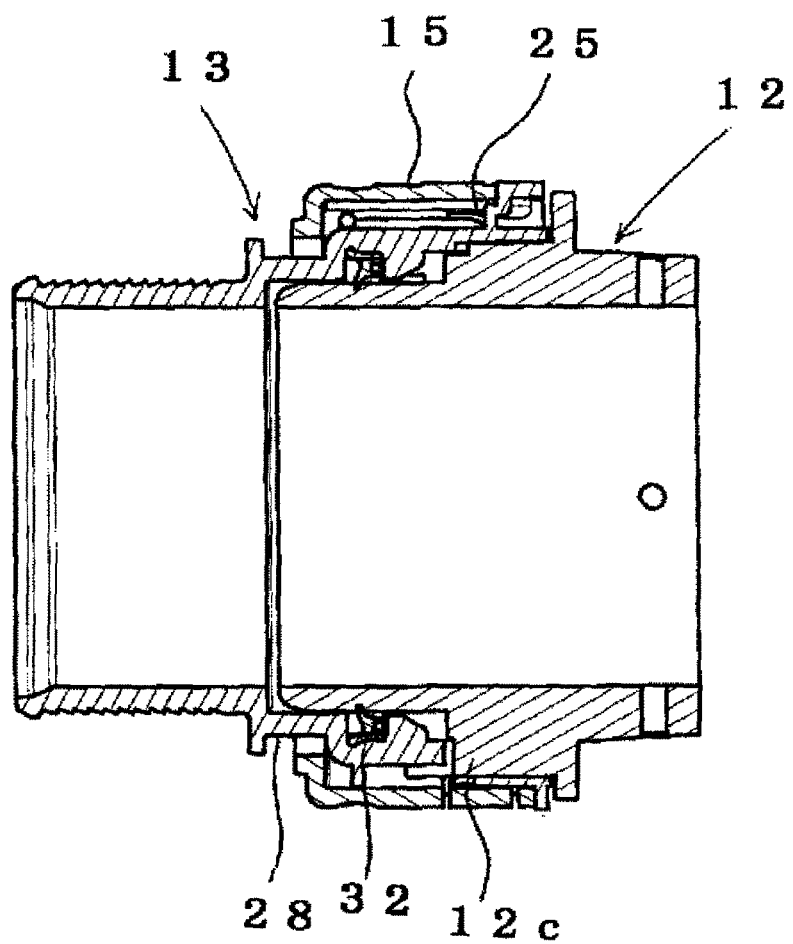
FIG. 18 is a cross section taken along lines B-B in FIG. 17.

Next, for confirming the fastening state, as illustrated in FIG. 17 and FIG. 18, the ring member 15 is caused to slide axially to fit the fitting portion 18 and the fitted portion 19. By fitting the fitting portion 18 and the fitted portion 19, the ring member 15 becomes a non-rotatable state and the identification portion 28 formed in the housing 13 side appears, making it possible to visually confirm the fastening state. At this time, the lock projection 15b of the ring member 15 is locked to the projection 31 (refer to FIG. 1) of the housing 13 to retain this state. Accordingly the double lock state occurs, making it possible to maintain the secure lock state. In addition, the double lock state can be confirmed visually.

Since the outer periphery of the tip portion 14a of the lock member 14 is covered with the cover portion 30 by sliding the ring member 15 axially, it is possible to prevent an inadvertent force from acting from the outside.

Figure 13:
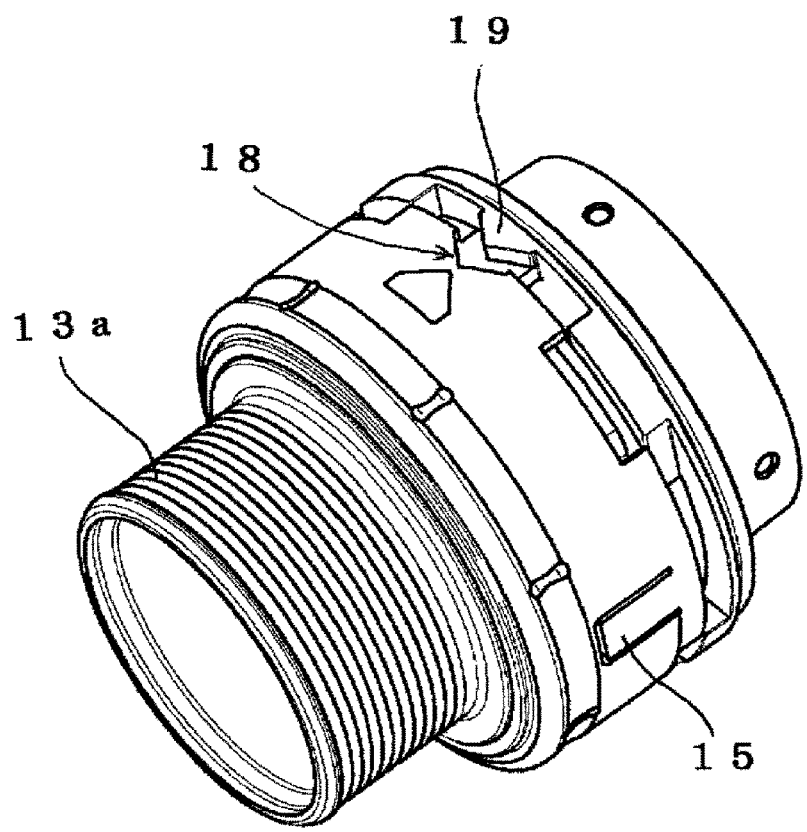
FIG. 13 is a perspective view that illustrates a fastening state of the lock mechanism and the tubular body.
Figure 14:
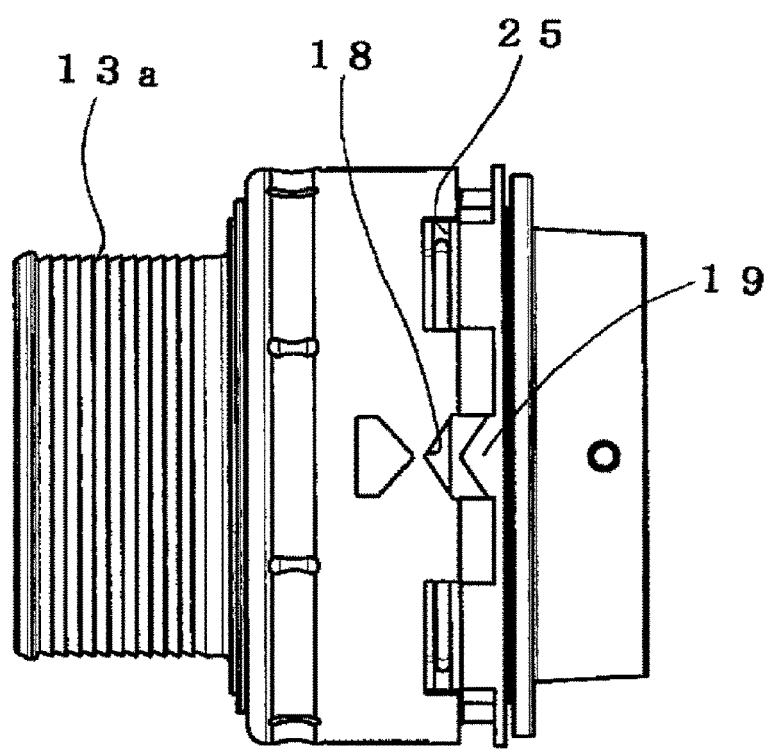
FIG. 14 is a plan view that illustrates the fastening state.
Figure 15:
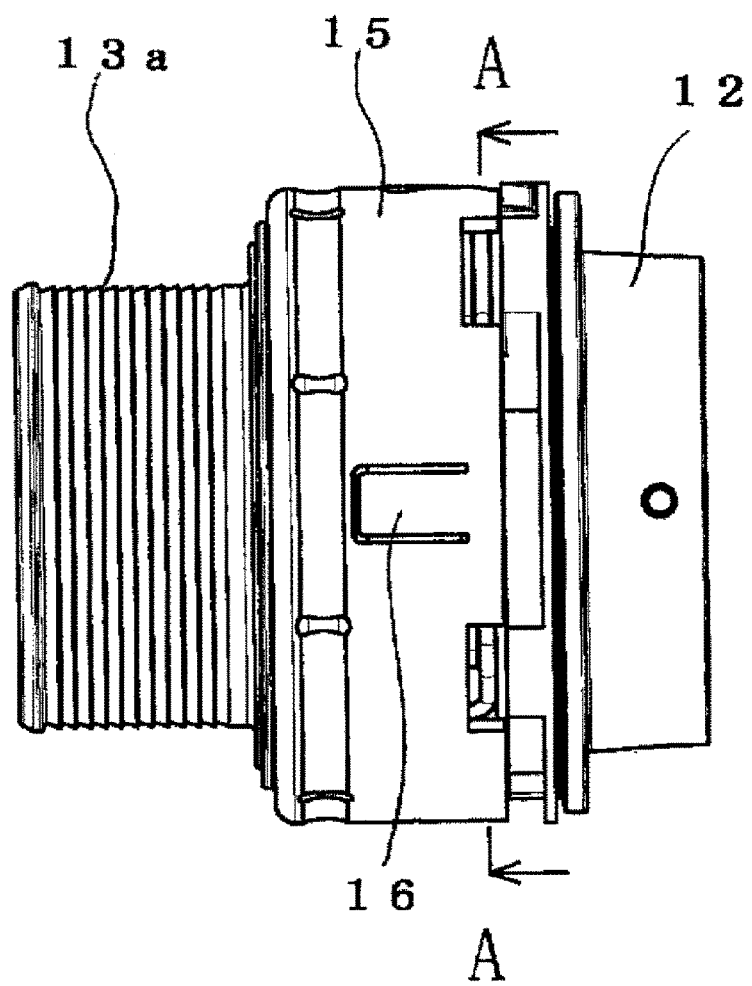
FIG. 15 is a side view that illustrates the fastening state.
Figure 16:
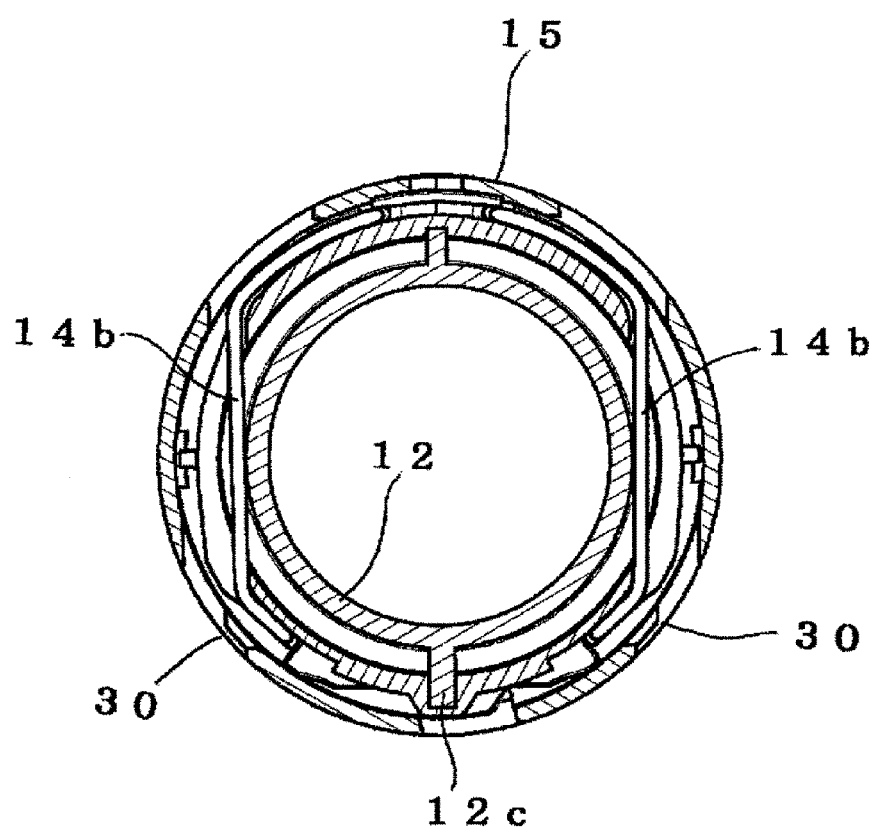
FIG. 16 is a cross section taken along lines A-A in FIG. 15.

In a case of releasing the engagement between the tubular body 12 and the housing 13, first, as illustrated in FIG. 13 and the like, the fitting portion 18 is separated from the fitted portion 19 by sliding the ring member 15 axially. Next, the ring member 15 rotates in an unlock direction. Then, one tip portion 14a of the lock member 14 is pushed to run over the first slide surface 27a and is enlarged to open in an outer peripheral direction. Further, since the first slide surface 27a has an approximately vertical inclination, it is possible to largely enlarge and open the leg portion 14b of the lock member 14 even by a short revolving stroke, thereby shortening a revolving stroke of each of the lock member 14 and the ring member 15.

In addition, since a tip portion of the leg portion 14b of the lock member 14 is configured as the bend portion 14c bent inward, even if the leg portion 14b opens, the leg portion 14b does not project almost from the outer periphery of the housing 13. Furthermore, since the rotational range of the bend portion 24 and the ring member 15 is limited by the gap H formed between the guide walls 21, there is no possibility that the bend portion 24 and the ring member 15 excessively rotate.

The other tip portion 14a of the lock member 14 is pulled to run over the second slide surface 27b and is enlarged to open in the outer peripheral direction based on an end edge of the slit 26. That is, since the tip portion 14a alone runs over the second slide surface 27b at the beginning of the release operation, the movement start is light. When the lock member 14 further rotates, since the lock member 14 opens with the tip portion 14a of the lock member 14 as an operational point, based on the end edge, the tip portion 14a is enlarged to open more largely by a short revolving stroke, thereby achieving disengagement from the engagement portion 11. In this way, the respective tip portions 14a open to cause the leg portions 14b to be enlarged to open to right and left and are out of the engagement portion 11 and the engagement is released, making it possible to pull out the tubular body 12 (refer to FIG. 2).

According to the present invention, since the release operation can be performed by simply rotating the ring member 15 in a lateral (circular direction of the housing) direction, the ring member 15 has no projection and the release can be done even in a narrow place. In addition, since the lock member 14 is widened by the slide surfaces of the first slide surface 27a and the second slide surface 27b having the different inclinations, the release operation can be performed by a small force. That is, since the bend portion 24 does not project in both of the lock state and the unlock state, the operation in the narrow space is made possible.

Furthermore, when the ring member 15 is rotated in the unlock direction and a finger is released from the ring member 15 after unlocked, the engagement projection 16a of the ring member 15 drops in the locked portion 17 of the housing 13 to maintain the unlock state (waiting state). That is, the ring member 15 cannot be rotated. Therefore, an erroneous operation rarely occurs.

In this state, as illustrated in FIG. 12, the tip portions 14a are respectively positioned to run over the first slide surface 27a and the second slide surface 27b, so that the lock member 14 is elastically deformed. That is, the lock member 14 is maintained in a state where elastic energy is accumulated. Furthermore, in the waiting state, as illustrated in FIG. 2, the fitting portion 18 and the fitted portion 19 abut on each other in deviating positions, so that the ring member 15 cannot slide axially.

In this way, according to the present invention, since it is possible to maintain the unlock state of the lock member 14, it is not necessary to insert the heavy hose while rotating the ring member 15 in one hand, making it possible to insert the hose in both hands. Therefore, the locking work of the tubular body can be facilitated. Furthermore, since the ring member 15 has no projecting section, there is no possibility of damaging the other components in a case of removing the ring member 15.

In the above embodiment, a case of providing the lock release projecting portion 12c in the tubular body 12 side is explained, but the lock release projecting portion 12c can be eliminated by increasing a projecting amount of the engagement projection 16a to the inner periphery of the mount opening 13b of the housing.

With this configuration, the positioning between the locked portion 17 and the lock release projecting portion 12c upon inserting/mounting the tubular body 12 becomes unnecessary.

The lock mechanism of the tubular body in the present invention can be used in pipes for a radiator, an intake pipe (the periphery of a throttle valve), an intercooler and battery pack and the like in a construction machine, as a lock mechanism of a tubular body for piping. In addition, the lock mechanism of the tubular body in the present invention can be used for pipes in household equipment and agricultural water. Furthermore, the lock mechanism body of the tubular body may have the structure of cutting off fluid, such as a closed plug or a plug cap (blind lid).

REFERENCE SIGNS LIST

10 LOCK MECHANISM OF TUBULAR BODY
11 ENGAGEMENT PORTION
12 TUBULAR BODY
12a TIP PORTION
12b BASE END PORTION
12c LOCK RELEASE PROJECTING PORTION
13 HOUSING
13a HOSE CONNECTING PORTION
13b MOUNT OPENING
13c SHALLOW GROOVE PORTION
14 LOCK MEMBER
14a TIP PORTION
14b LEG PORTION
14c BEND PORTION
15 RING MEMBER
15b LOCKING PROJECTION
16 LOCKING PORTION
16a ENGAGEMENT PROJECTION
17 LOCKED PORTION
18 FITTING PORTION
18a NOTCH
18b NOTCH
19 FITTED PORTION
20 FLANGE
21 GUIDE PORTION
22 PROJECTION
23 JOINT PORTION
24 BEND PORTION
25 GUIDE WALL
26 SLIT
27 SLIDE INCLINED SURFACE
27a FIRST SLIDE SURFACE
27b SECOND SLIDE SURFACE
28 IDENTIFICATION PORTION
29 PROJECTING PORTION
30 COVER PORTION
31 PROJECTION
32 SEAL MEMBER

It should be noted that all the contents of the specification, claims, drawings and abstract in Japanese Patent Application No. 161506/2014 filed on Aug. 7, 2014 are cited herein, and are incorporated as the disclosure of the specification in the present invention.

What is claimed is:

1. A lock mechanism of a tubular body, the lock mechanism comprising:
    a housing having one end configured to mount to the tubular body, and including a locked portion, and a fitted portion on an outer periphery of the housing;
    a lock member configured to lock and unlock the housing and the tubular body; and
    a ring member that is rotatably attached on the outer periphery of the housing to move the lock member between a lock position and an unlock position, wherein the ring member includes
        a locking portion configured to be locked to the locked portion of the housing such that the lock member is retained in the unlock position in a state where an urging force is accumulated in the lock member, and unlocked from the locked portion of the housing by an insertion of the tubular body into the housing to release the urging force accumulated in the lock member such that the lock member moves to the lock position together with the ring member to lock the tubular body to the housing; and
        a fitting portion to fit in the fitted portion of the housing,
    wherein the ring member is configured to slide in an axis direction of the tubular body after being locked to the housing such that the fitting portion of the ring member is fitted in the fitted portion of the housing to prevent a rotation of the ring member.

2. The lock mechanism of the tubular body according to claim 1, wherein
    the locking portion is an elastic element;
    the locked portion is a hole portion;
    the elastic element enters the hole portion to be locked;
    the tubular body is provided with a lock release projecting portion; and
    the lock release projecting portion pushes the elastic element out of the hole portion to unlock the ring member from the housing.

3. The lock mechanism of the tubular body according to claim 1, wherein the lock member includes a bend portion bent in an axial direction of the housing; the ring member further includes a projecting portion in a position corresponding to the bend portion; and the ring member and the lock member rotate integrally by the bend portion and the projecting portion.

4. The lock mechanism of the tubular body according to claim 3, wherein the housing further includes a slide inclined surface; and a tip portion of the lock member slides on the slide inclined surface by the rotation of the ring member, whereby the lock member is enlarged to open to become in the unlock position.

5. The lock mechanism of the tubular body according to claim 1, wherein the housing further includes an identification portion to be recognized visually after the fitting portion of the ring member is fit into the fitted portion of the housing.

6. The lock mechanism of the tubular body according to claim 1, wherein the ring member further includes a cover portion that covers a free end of the lock member.

7. The lock mechanism of the tubular body according to claim 1, wherein the lock member is formed of a metallic wire rod having elasticity.

8. The lock mechanism of the tubular body according to claim 1, wherein
    the locked portion of the housing is a through-hole, and
    the locking portion of the ring member includes an engagement projection projecting from an inner periphery of the ring member toward the housing, the engagement projection being configured to be pushed out of the through-hole to unlock the ring member from the housing by the insertion of the tubular body.

9. The lock mechanism of the tubular body according to claim 8, wherein the ring member further includes a projecting portion projecting from the inner periphery of the ring member, and
    the lock member includes a bend portion engaging the projecting portion to rotate along with the ring member.

* * * * *